(12) United States Patent  
Dubinsky

(10) Patent No.: US 7,308,591 B2
(45) Date of Patent: Dec. 11, 2007

(54) POWER MANAGEMENT OF MULTI-PROCESSOR SERVERS

(75) Inventor: Dean V. Dubinsky, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 11/013,779

(22) Filed: Dec. 16, 2004

(65) Prior Publication Data

US 2006/0149985 A1 Jul. 6, 2006

(51) Int. Cl.
*G06F 1/32* (2006.01)
(52) U.S. Cl. ...................... 713/324; 713/321
(58) Field of Classification Search ............... 713/324, 713/321
See application file for complete search history.

(56) References Cited

U.S. PATENT DOCUMENTS

| | | | | |
|---|---|---|---|---|
| 5,696,952 | A | 12/1997 | Pontarelli | 713/600 |
| 5,784,628 | A | 7/1998 | Reneris | 713/300 |
| 6,604,201 | B1 * | 8/2003 | Takahashi et al. | 713/323 |
| 7,032,119 | B2 * | 4/2006 | Fung | 713/320 |
| 2003/0037150 | A1 | 2/2003 | Nakagawa | 709/229 |
| 2003/0126202 | A1 | 7/2003 | Watt | 709/203 |
| 2003/0182415 | A1 | 9/2003 | Vicard | 709/223 |
| 2003/0202655 | A1 * | 10/2003 | Nattkemper et al. | 379/413 |
| 2003/0204758 | A1 | 10/2003 | Singh | 713/320 |
| 2003/0204759 | A1 | 10/2003 | Singh | 713/320 |

* cited by examiner

*Primary Examiner*—Thuan Du
(74) *Attorney, Agent, or Firm*—Lieberman & Brandsdorfer, LLC

(57) ABSTRACT

A method and system are provided for dynamically managing delivery of power to partitionable elements in a computer system while supporting terms of a Service Level Agreement (SLA). Parameters of the SLA are gathered in conjunction with the topology of the computer system. Transactions associated with the SLA are monitored and high and low usage periods are predicted based upon a history of transactions. Power to partitionable elements of the computer system may be adjusted during high and low usage periods. In addition, dynamic management of the partitionable elements is provided in response to current demands. Management of the partitionable elements are all made in compliance with the SLA.

16 Claims, 2 Drawing Sheets

POWER MANAGEMENT OF MULTI-PROCESSOR SERVERS

BACKGROUND OF THE INVENTION

1. Technical Field

This invention relates to a system and method for managing partitionable elements in a multiple element computer system. More specifically, the partitionable elements are managed in relation to terms of a service level agreement.

2. Description of the Prior Art

A multiprocessor computer system by definition contain multiple processors, also referred to herein as CPUs, that can execute multiple processes or multiple threads within a single process simultaneously in a manner known as parallel computing. In general, multiprocessor systems execute multiple processes or threads faster than conventional uniprocessor systems, such as personal computers (PCs), that execute programs sequentially. The actual performance advantage is a function of a number of factors, including the degree to which parts of a multithreaded process and/or multiple distinct processes can be executed in parallel and the architecture of the particular multiprocessor system at hand.

The architecture of shared memory multiprocessor systems may be classified by how their memory is physically organized. In distributed shared memory (DSM) machines, the memory is divided into modules physically placed near one or more processors, typically on a processor node. Although all of the memory modules are globally accessible, a processor can access local memory on its node faster than remote memory on other nodes. Because the memory access time differs based on memory location, such systems are also called non-uniform memory access (NUMA) machines. In centralized shared memory machines, on the other hand, the memory is physically in one location. Centralized shared memory computers are called uniform memory access (UMA) machines because the memory is equidistant in time for each of the processors. Both forms of memory organization typically use high-speed caches in conjunction with main memory to reduce execution time.

Processor nodes may be grouped to form a partition, which is a collection of one or more nodes interconnected together to form a computing environment for an operating system. Multiple partitions can exist within the same computer system. Each partition within a computer system executes a single independent operating system image. A multiprocessor computer system may be in the structure of a collection of nodes or partitions, including service processor hardware, a management console and other infrastructure, representing a single manageable and configurable environment. Accordingly, a system can be split into multiple logical computer systems or partitions, each of which executes a single operating system image.

In addition to multiprocessor computing systems in the form of partitioned nodes, there are also bladed multiprocessing computing systems. The bladed system is a collection of distributed computing resources available over a local or wide area network that appears as one large virtual computing system to an end user or application. Each computing resource is a server on a removable card that plugs into a shared infrastructure. The computing resources share a common chassis, power supply, service processor, fibre, storage, cooling, heat dissipation, keyboard, video, mouse and a connection to the local or wide area network. Each resource within the system may be configured to function under different operating systems. Accordingly, a bladed multiprocessing system is an example of a scalable system with multiple partitionable resources adapted to communicate through common communication connections.

A partitioned multiprocessor computing environment and a bladed multiprocessor computing environment are both comprised of multiple compute elements. Each element includes at minimum a printed circuit board with one or more microprocessors, memory, logic to connect and control the processors and memory, an I/O controller, and a communication port. Current management of multiple compute element systems, including bladed computer systems as well as partitioned computer systems, require shut-down of a specific compute element when maintenance is required. Each element operates in one of two states, on or off. There is no intermediate state of operation. Lack of power management control at the element level, creates a major problem when heat dissipation, cooling, or power consumption becomes an issue in a multiple element system.

One of the features present on today's laptop and personal computers is the ability of the computer to be placed in a low power state of operation, by reducing the processor frequency, turning off unneeded I/O, suspension, or hibernation. These low power states of operation are known in the art in relation to personal computers. In the Suspend state, the clock for the processor(s) is halted, which greatly reduces power to the processor and other accessories on the motherboard, but the memory remains intact. This is a state of low power consumption. When the operator of the computer wants to regain usage of the hardware accessory, the operator must Restore full power and restart the clock to the processor, the motherboard, and the associated hardware accessories, eliminating a full system restart since the memory remains intact. In addition to the Suspend state, the personal computer may also be placed in the low power state of Hibernate where power to the computer is turned off following replication of the memory on storage media. Therefore, it is less time consuming to enter the Suspend state and Restore power to the computer or to enter the Hibernate state and resume delivery of power to the computer, rather than to terminate power to the computer and restart the full system at a later time. Furthermore, reducing the clock speed on a processor is less time consuming than to Suspend and Resume a system which is less time consuming than Hibernate and Restore, due to the mechanisms involved. Accordingly, use of the Suspend or Hibernate states on the laptop or personal computer are two examples of power management on a personal computer system.

Finally, it has become common in the marketplace to employ the use of Service Level Agreements (SLAs) to define the relationship between a customer utilizing computer resources of a service provider. For example, the SLA commonly includes the criteria of the services to be provided, such as providing a certain number of web pages, supporting transactions, etc. Technology exists to reduce the power consumption on a computer system by turning off unused parts of the system, such as I/O, drives, slowing down the processor(s), quiescing or suspending processor(s), hibernating processor(s), and even powering off parts of the system when they are not required. Newer systems are being developed and delivered to customers that have multiple processors, multiple cores within a processor package, multiple central electronic complex (CEC), and/or multiple Blades. At full load of these newer systems, all of the elements therein may need to be available to operate within the terms of the SLA. However, during off-peak times, some of the hardware in the newer system may sit idle for an extended period of time while consuming electricity and generating heat. Accordingly, there is a need to apply power management to these newer systems while delivering service to the customer within the terms of the SLA.

SUMMARY OF THE INVENTION

This invention comprises a method and system for monitoring the terms of a service level agreement while managing delivery of power to a partitionable element to provide a computer system that delivers on demand services to its customer.

In one aspect of the invention, a method is provided for managing power delivery to a partitionable element within a multiple element computer system. Data pertaining to a service level agreement associated with usage of the computer system is collected. Thereafter, a transaction on the computer system is monitored. Delivery of power to one or more of the element is adjusted to ensure compliance with the service level agreement.

In another aspect of the invention, a system is provided for managing delivery of power to a partitionable element. Two or more partitionable elements are provided in the system. A collection manager collects data related to a service level agreement associated with usage of the elements in response to a transaction that employs at least one of the elements. In addition, an adjustment manager is provided to control delivery of power to at least one of the elements to ensure compliance with the service level agreement.

In yet another aspect of the invention, an article is provided with a computer-readable signal-bearing medium. Means in the medium are provided for collecting data pertaining to a service level agreement associated with usage of the computer system. In addition, means in the medium are provided for monitoring a transaction on the computer system. Means in the medium are also provided for adjusting delivery of power to at least one of the elements to ensure compliance with the service level agreement.

Other features and advantages of this invention will become apparent from the following detailed description of the presently preferred embodiment of the invention, taken in conjunction with the accompanying drawings.

DESCRIPTION OF THE EMBODIMENTS

Overview

A platform is provided to dynamically manage delivery of power to partitionable elements of a computer system. In one embodiment, the platform is in the form of a control program in a computer readable medium that accepts commands and input from an operator. The platform predicts high and low utilization periods of the computer system servicing a SLA, and determines required partitionable elements to service the SLA during both the high and low utilization periods. In addition, the platform dynamically monitors the computer system and supports management of the partitionable elements for on-demand support of transaction. If one or more transactions require additional hardware support, the platform may communicate with the operating system or service processor of the computer system to provide additional partitionable elements to support the increased demand. Similarly, if the platform determines that there is an excess availability of partitionable elements for a current demand, the platform may communicate with the operating system or service processor of the computer system to reduce the quantity of partitionable elements while supporting the level of demand. To optimize power management further, ensuring the ability to respond to increased work loads, the platform places additional partitionable element into different states of reduced power consumption. To always ensure a response, a partitionable element may still be active, but with the processor clock may be slowed, reducing power. Other partitionable elements may be placed in suspended mode, where the processor is halted, but power remains to the system, ensuring rapid recovery. Finally, when it is obvious due to the utilization data, that one or more elements will not be needed for long time periods, these partitionable elements could be placed into hibernation mode, where no power is required. As periods of higher utilization approach, the hibernated elements could be placed into suspend mode, moved up to reduced processor clock frequency, and finally up to full operation as utilization requirements reach peak times. Accordingly, the platform functions as a manager to dynamically monitor and manage partitionable elements to support transactions associated with an SLA.

Technical Details

Figure 1:
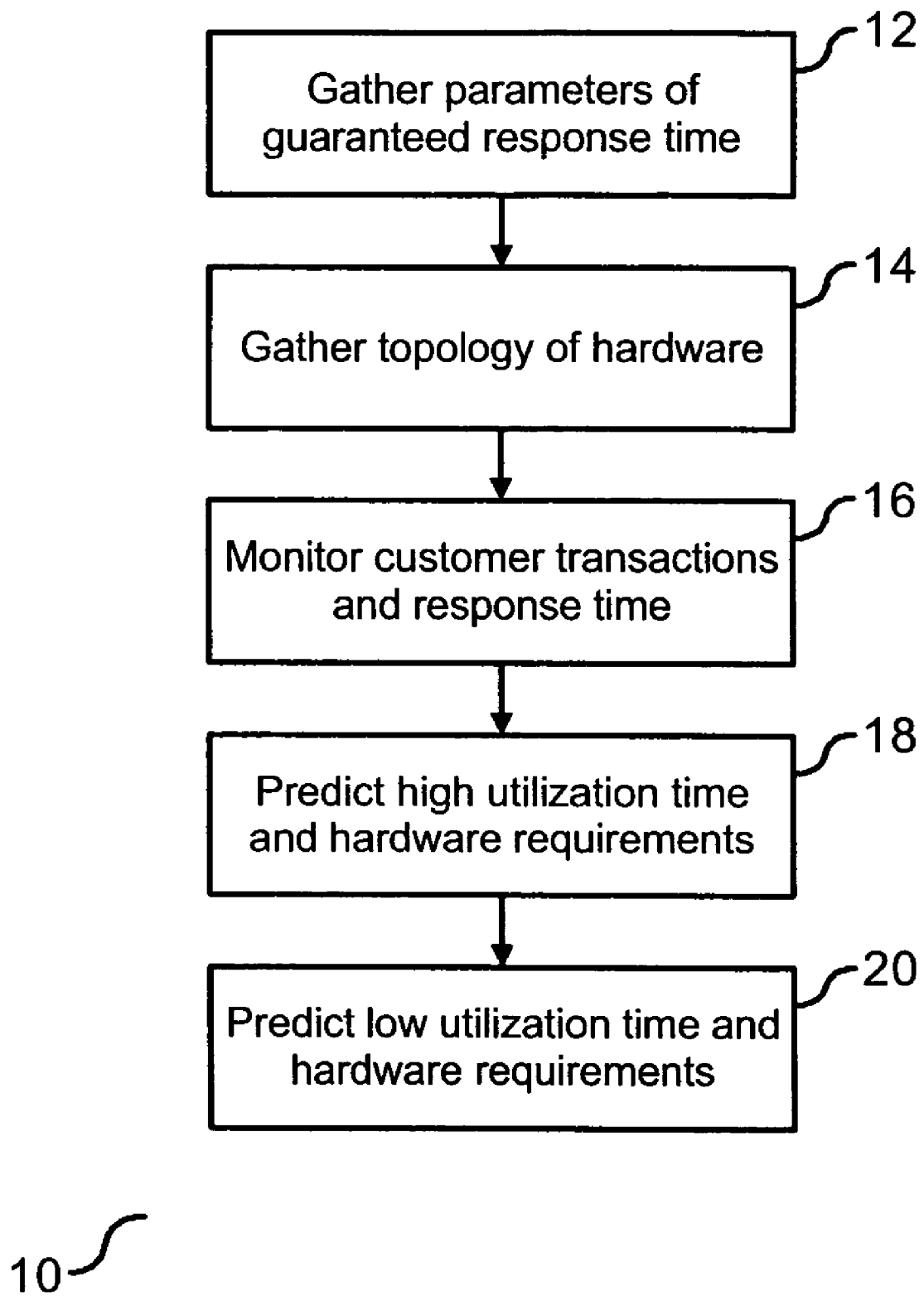
FIG. 1 is a flow chart of a platform gathering terms of a service level agreement and topology of a manageable computer system.

A platform is provided to receive and manage terms of a SLA associated with a multiple processor computer system with partitionable elements, such as a central electronic complex (CEC) and/or a Blade. The platform functions as a management tool of the SLA and a communication tool to the partitionable elements of the computer system. In one embodiment, the platform is in the form of a computer implemented program that receives the terms and conditions of the SLA and functions to maintain operation of hardware within the guaranteed terms of the SLA. FIG. 1 is a flow chart (10) illustrating a process for configuring the SLA. Parameters of a response time guaranteed to the customer are gathered and entered in the platform (12). In addition, the topology of the hardware elements of the computer system provided to support the SLA are gathered and entered in the platform (14). For example, the platform needs to have knowledge of the processors, the associated processor speeds, the location of the processors, etc. Once the platform has gathered the information at steps (12) and (14), it may begin monitoring customer transactions and response time of the hardware to complete the customer transactions (16). Based upon a plurality of transactions set forth by customers over a period of time, the platform may predict utilization of the associated hardware during different time periods. For example, the platform may predict hardware usage during specific months, specific weeks, and even specific time periods on specified days of the week. The platform predication may be used to determine the required hardware availability during a high utilization period (18). Similarly, the platform may be used to determine the required hardware availability during a low utilization period (20). In fact, during a low utilization period, it may be desirable to place targeted hardware elements in a low operating environment so that they consume less energy during the low utilization period. Accordingly, the platform is used to determine parameters of the SLA in conjunction with hardware operating requirements during low and high utilization periods.

Figure 2:
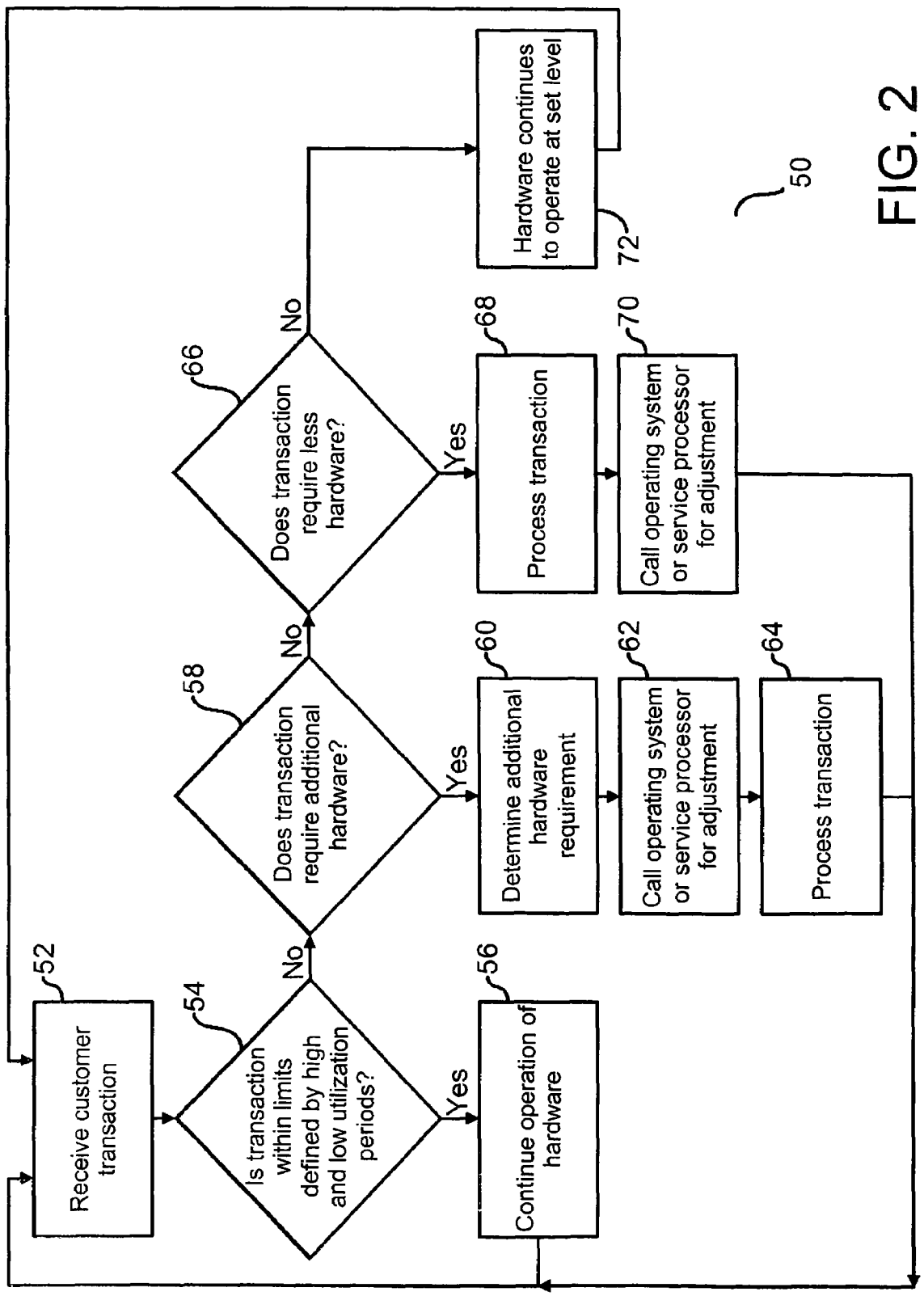
FIG. 2 is a flow chart of a platform managing delivery of power to partitionable elements of a computer system according to the preferred embodiment of this invention, and is suggested for printing on the first page of the issued patent.

The platform manages associated hardware, and more specifically partitionable elements of the hardware, in order to cooperatively and efficiently maintain the terms of the SLA during both high and low utilization periods. FIG. 2 is a flow chart (50) illustrating a process for maintaining the terms of the SLA for the customer while efficiently operating the hardware to support customer transactions and guaranteed response time for the associated transactions. Upon receipt of a transaction from a customer (52), a test is conducted to determine if the transaction, in combination with other transactions occurring during the same time period, is within an upper limit defined by a high utilization usage and a low limit defined by a low utilization usage for the time period in which the transaction is taking place (54). A positive response to the test at step (54) is an indication that the hardware supporting the terms of the SLA is being properly operated and maintained. As such, the hardware will continue to operate at a level set by the platform for the time period (56) until receipt of a subsequent transaction from a customer. However, a negative response to the test at step (54) is an indication that the hardware supporting the terms of the SLA is not efficiently operating within boundaries identified to support the SLA for utilization periods. A subsequent test is conducted to determine if the transaction, in combination with other transaction occurring during the same time period, requires additional hardware than the platform has available for the time period in which the transaction has occurred (58). If the response to the test at step (58) is positive, the platform determines the additional hardware requirement (60). Following the determination at step (60), a call is made to the operating system or an associated service processor to adjust one or more partitionable elements to properly service the customer transaction (62) followed by processing of the transaction (64). However, if the response to the test at step (58) is negative, another test is conducted to determine if the transaction, in combination with other transactions occurring during the same time period, requires less hardware than available for the time period in which the transaction has occurred (66). Similar to the test at step (58), a positive response to the test at step (66) will result in processing the transaction (68) followed by a call to the operating system or associated service processor to adjust one or more partitionable elements so that the required hardware available for the set time period is reduced (70), and return to step (52) to wait for a transaction. However, a negative response to the test at step (66) is an indication that the hardware supporting the terms of the SLA is being properly operated and maintained. As such, the hardware will continue to operate at the set level for the time period (72) until receipt of a subsequent transaction from a customer. Accordingly, the platform monitors the performance level of the hardware associated with receipt of customer transactions for set time periods and appropriately adjust availability of partitionable elements.

Each processor may operate in one of five states, two of the states being maximum power or no power. The three remaining states are intermediate states of operation. An intermediate states of operation may include a selective reduction of power, Suspend, and Hibernate. The selective reduction of power enables a processor to continue operation, but may not provide optimum performance of the full capabilities of the processor and any associated power consuming accessories. The Suspend state halts the clock for the processor, maintaining power to the memory, and placing the system in a low power state. In order to select the Suspend state, the processor must have a battery or remain in communication with a power source. To return the processor to full power from the Suspend state, the operating system or service processor must issue a Resume command, which restarts the clock to the processor. The procedure associated with the Resume command returns the component in communication with the processor to full operating power without requiring a reboot of the processor. The Hibernate state writes all memory contents of the processor and memory to local or network attached storage, and a marker is sent to the operating system not to boot when the processor is restored. Power is then removed completely from the partitionable element. Once the Operating System or Service Processor issues a Restore command, power is returned to the partitionable element. The marker will indicate the location of the memory contents for the processor thereby allowing the operating system to retrieve the memory contents stored in the local or network attached storage and to load the memory contents into memory. The Hibernate state requires that the processor write it's memory to storage prior to termination of power. When it is determined that the processor is to be returned to full power from the Hibernate state, a Restore command to the processor must be issued. The process of restoring the processor involves, restoring power to the partitionable element, retrieving memory contents that was stored on a local disc or network attached storage in communication with the processor. These intermediate states of operation enable the platform to return full power at a later time without requiring a complete shut-down of power followed by a rebooting of the processor. In each of the intermediate states of operation, less power is consumed by the processor and the selected power consuming accessories of the processor. Accordingly, the three intermediate states of operation enable the platform to manage distribution of power.

The intermediate states of operation of a processor are available to partitionable elements of a CEC and Blade. As shown in FIG. 2, the platform has the capability of predicting hardware requirements for defined periods of time. The set period of time may be according to the month, week, day, hour, or a customized time period set by an operator of the platform. In response to a determination at step (54) that the transaction will cause the hardware to exceed the level of support available at the set time, the platform sends either an in-band communication to the operating system in communication with the partitionable elements of the computer system supporting SLA, or an out-of-band communication to a service processor in communication with the partitionable elements supporting the SLA. The communication will make additional partitionable elements available to support the transaction if the partitionable elements are physically available. The process of making additional partitionable elements available may include adjusting the frequency of one or more processors, unhalting the clock to one or more processors, or restoring power to one or more processors to meet the demands of the transactions. Similarly, in response to a determination at step (66) that the transaction will result in excess partitionable elements being available at the set time in comparison to the platform determined level of availability, the platform sends either an in-band communication to the operating system in communication with the partitionable elements supporting the SLA, or an out-of-band communication to a service processor in communication with the partitionable elements supporting the SLA. The communication will adjust the available of the partitionable elements to continue supporting transactions within the terms of the SLA while decreasing the excess availability of the partitionable elements. The process of reducing hardware availability may include slowing down one or more processors, placing one or more processors on Suspend or Hibernate, and powering off one or more processors and other devices until the transaction load is increased. In adjusting one or more of the partitionable elements, the remaining partitionable elements in the CEC or Blade system continue to operate. Accordingly, by adjusting power to one or more partitionable processors in a multiprocessor system, power consumption and resource utilization may be appropriately managed based upon customer transactions and predicted workload of the platform.

ADVANTAGES OVER THE PRIOR ART

The platform monitors and manages performance of one or more processors or other partitionable elements of a computer system supporting a SLA. In one embodiment, the platform analyzes past performance of the computer system supporting the SLA to predict anticipated usage periods. In addition, the platform dynamically monitors and manages the demands of the computer system to ensure that the available partitionable elements are within the limits of the SLA. The platform may communicate with the operating system or service processor to adjust any of the processors or partitionable elements in response to entering a usage period or to a change in work load demand. Accordingly, the platform dynamically manages delivery of power to partitionable elements therein.

ALTERNATIVE EMBODIMENTS

It will be appreciated that, although specific embodiments of the invention have been described herein for purposes of illustration, various modifications may be made without departing from the spirit and scope of the invention. In particular, the partitionable element that is being monitored and controlled in the multiprocessing system may include multiple central electronic complexes, multiple blades, a processor housed within a central electronic complex, a group of processors housed within a central electronic complex, a processor housed within a blade, and a group of processors housed within a blade. In addition, the platform may be an automated control program that is automated to operate based upon input data provided by an operator, a system that requires manual program control from an operator, or a combination thereof. Accordingly, the scope of protection of this invention is limited only by the following claims and their equivalents.

I claim:

1. A method for managing power delivery to a partitionable element within a multiple element computer system comprising:
    collecting data pertaining to a service level agreement associated with usage of said computer system;
    monitoring a transaction on said computer system;
    analyzing past performance associated with said service level agreement to predict anticipated usage periods; and
    adjusting delivery of power to at least one of said elements to ensure compliance with said service level agreement, wherein the step of adjusting delivery of power to at least one of said elements includes a call selected from the group consisting of: an in-band call to an operating system in communication with said element, and an out-of-band call to a service processor in communication with said element.

2. The method of claim 1, further comprising monitoring response time of said multiple element computer system once power has been adjusted to at least one of said elements.

3. The method of claim 1, wherein said element is selected from a group consisting of: multiple central electronic complexes (CECs), multiple blades, a processor housed within a CEC, a group of processors housed within a CEC, a processor housed within a blade, and a group of processors housed within a blade.

4. The method of claim 1, wherein the step of adjusting delivery of power to at least one of said elements is responsive to work load selected from a group consisting of: current work load, prediction of work load, and terms of said service level agreement.

5. The method of claim 1, wherein the step of adjusting delivery of power to at least one of said elements includes transitioning said element to a state selected from a group consisting of: decreasing operating frequency of a processor in communication with said element, increasing operating frequency of a processor in communication with said element, halting a clock of a processor in communication with said element placing said element in suspend mode, hibernating said element, and powering off said element.

6. A system for managing power delivery to a partitionable element comprising:
    two or more partitionable elements;
    a collection manager adapted to collect data related to a service level agreement associated with a usage of said elements in response to a transaction adapted to employ at least one of said elements;
    a prediction manager adapted to analyze past performance associated with said service level agreement and to predict anticipated usage periods; and
    an adjustment manager adapted to control delivery of power to at least one of said elements to ensure compliance with said service level agreement, wherein said adjustment manager conducts a call selected from the group consisting of: an in-band call to an operating system in communication with said element, and an out-of-band call to a service processor in communication with said element.

7. The system of claim 6, further comprising a response time manager adapted to collect response data of said computer system subsequent to an adjustment of at least one of said elements.

8. The system of claim 6, wherein said element is selected from a group consisting of: multiple central electronic complexes (CECs), multiple blades, a processor housed within a CEC, a group of processors housed within a CEC, a processor housed within a blade, and a group of processors housed within a blade.

9. The system of claim 6, wherein said adjustment manager is responsive to work load selected from a group consisting of: current work load, prediction of work load, and terms of said service level agreement.

10. The system of claim 6, wherein said adjustment manager transitions delivery of power to at least one of said elements to a state selected from a group consisting of: decreasing operating frequency of a processor in communication with said element, increasing operating frequency of a processor in communication with said element, halting a clock of a processor in communication with said element placing said element in suspend mode, hibernating said element, and powering off said element.

11. An article comprising:
a computer-readable storage medium having computer executable instructions stored thereon and being executed by a processor, said instructions comprising:
instructions to collect data pertaining to a service level agreement associated with usage of said computer system;
instructions to monitor a transaction on said computer system;
instructions to analyze past performance associated with said service level agreement to predict anticipated usage periods; and
instructions to adjust delivery of power to at least one of said elements to ensure compliance with said service level agreement, wherein said instructions include a call selected from the group consisting of: an in-band call to an operating system in communication with said element, and an out-of band call to a service processor in communication with said element.

12. The article of claim 11, wherein the medium is a recordable data storage medium.

13. The article of claim 11, further instructions to monitor response time of said multiple element computer system once power has been adjusted to at least one of said elements.

14. The article of claim 11, wherein said element is selected from a group consisting of: multiple central electronic complexes (CECs), multiple blades, a processor housed within a CEC, a group of processors housed within a CEC, a processor housed within a blade, and a group of processors housed within a blade.

15. The article of claim 11, wherein said instructions to adjust delivery of power to at least one of said elements is responsive to work load selected from a group consisting of: current work load, prediction of work load, and terms of said service level agreement.

16. The article of claim 11, wherein said instructions to adjust delivery of power to at least one of said elements includes transitioning said element to a state selected from a group consisting of: decreasing operating frequency of a processor in communication with said element, increasing operating frequency of a processor in communication with said element, halting a clock of a processor in communication with said element placing said element in suspend mode, hibernating said element, and powering off said element.

* * * * *